(12) United States Patent
Watanabe et al.

(10) Patent No.: US 8,424,402 B2
(45) Date of Patent: Apr. 23, 2013

(54) BALL SCREW UNIT

(75) Inventors: Hajime Watanabe, Kashiwara (JP); Satoshi Kondo, Okazaki (JP); Yasuhiro Ohta, Kitanagoya (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 786 days.

(21) Appl. No.: 12/320,015

(22) Filed: Jan. 14, 2009

(65) Prior Publication Data

US 2009/0193916 A1    Aug. 6, 2009

(30) Foreign Application Priority Data

Jan. 15, 2008 (JP) ................................ 2008-005497

(51) Int. Cl.
*F16H 3/06*    (2006.01)

(52) U.S. Cl.
USPC ........................................ 74/89.38; 74/89.37

(58) Field of Classification Search ................ 74/89.23, 74/89.37, 89.38, 89.39, 89.1; 192/85.21
See application file for complete search history.

(56) References Cited

U.S. PATENT DOCUMENTS

| | | | | |
|---|---|---|---|---|
| 1,901,996 A * | 3/1933 | Taylor | ............................. | 74/7 R |
| 2,413,295 A * | 12/1946 | Dath | ............................. | 267/212 |
| 2,501,386 A * | 3/1950 | Gibbs | ............................. | 81/476 |
| 3,083,592 A * | 4/1963 | Carlstedt | ....................... | 173/156 |
| 3,393,570 A * | 7/1968 | Whicker | ............................ | 74/57 |
| 4,466,511 A | 8/1984 | Garnett | | |
| 4,966,045 A | 10/1990 | Harney | | |
| 6,967,302 B2 * | 11/2005 | Peter | .............................. | 218/154 |
| 7,458,292 B2 * | 12/2008 | Scholz | ........................ | 74/424.72 |
| 7,681,470 B2 * | 3/2010 | Maiss | .......................... | 74/89.39 |
| 2002/0104394 A1 * | 8/2002 | Manzanares et al. | ......... | 74/89.26 |
| 2010/0162838 A1 * | 7/2010 | Hirai et al. | .................... | 74/89.33 |

FOREIGN PATENT DOCUMENTS

| | | |
|---|---|---|
| DE | 23 63 691 A1 | 7/1975 |
| EP | 0 146 914 A2 | 7/1985 |
| FR | 1.078.659 A | 11/1954 |
| GB | 2 102 910 A | 2/1983 |
| JP | 2005-264992 | 9/2005 |

OTHER PUBLICATIONS

European Search Report dated May 13, 2009.

* cited by examiner

*Primary Examiner* — Thomas B Will
*Assistant Examiner* — Abigail A Risic
(74) *Attorney, Agent, or Firm* — McGinn IP Law Group, PLLC

(57) ABSTRACT

The outer diameter of a spline nut and the inner diameter of a nut body holding portion of a housing gradually decrease in the downward direction. A ball screw protection unit includes a nut body taper face that is formed in the outer peripheral face of the spline nut, a holding portion taper face that is formed in the nut body holding portion, and a disc spring that is provided at the upper end of the spline nut and that biases the spline nut in such a direction that a friction force between the nut body taper face and the holding portion taper face increases (downward direction).

10 Claims, 2 Drawing Sheets

BALL SCREW UNIT

The disclosure of Japanese Patent Application No. 2008-005497 filed on Jan. 15, 2008 including the specification, drawings and abstract is incorporated herein by reference in its entirety.

BACKGROUND OF THE INVENTION

1. Field of the Invention

The invention relates generally to a ball screw unit.

2. Description of the Related Art

A ball screw unit that includes a screw shaft and a ball screw nut that is screwed onto the screw shaft via balls is commonly used for an electric actuator or a shock absorber. For example, Japanese Patent Application Publication No. 2005-264992 (JP-A-2005-264992) describes that a ball screw unit, which has a ball screw nut that is connected to a motor and a screw shaft that moves linearly, is applied to an electromagnetic shock absorber.

The electromagnetic shock absorber converts axial vibrations from a tire into rotational vibrations with the use of the ball screw unit, and controls a damping force with the use of the motor. When overstroke of a suspension occurs, for example, because a vehicle runs on to a bump, the motor, which has been rotating at a high speed, may stop suddenly and an excessive axial force may be applied to a ball screw due to an inertia torque. How to protect a ball screw mechanism in this case is an issue that needs to be resolved. In order to ensure adequate strength of the ball screw, a larger-sized ball screw unit may be employed. However, employing a larger-sized ball screw unit causes some inconveniences. For example, an inertia moment increases, which creates a need for a larger-sized motor. As a result, response of the motor deteriorates.

SUMMARY OF THE INVENTION

The invention provides a ball screw unit that ensures adequate strength of a ball screw without the need for upsizing.

An aspect of the invention relates to a ball screw unit which includes: a screw shaft that has a groove; a nut that is fitted to the groove of the screw shaft via balls and that has an outer diameter which gradually decreases in a predetermined direction; a nut holding portion that is provided on an outer peripheral face of the nut, that holds the nut, and that has an inner diameter which gradually decreases in the predetermined direction in accordance with a gradual decrease in the outer diameter of the nut; and a nut biasing member that biases the nut in the predetermined direction in which the outer diameter of the nut and the inner diameter of the nut holding portion gradually decrease. The outer diameter of the nut and the inner diameter of the nut holding portion gradually decrease in such a manner that when a force that proceeds in the direction opposite to the direction of the biasing force of the nut biasing member and that overcomes the biasing force is applied to the nut, a friction force between the outer peripheral face of the nut and an inner peripheral face of the nut holding portion decreases to allow relative movement between the nut and the nut holding portion.

The ball screw unit according to the aspect of the invention described above may further include a housing that holds the screw shaft, and a stopper that prevents a member, which moves linearly and which is one of the screw shaft and the nut, from moving beyond a movement limit position, by hitting the housing. In this ball screw unit, the grooves formed in the screw shaft may be a screw groove and spline grooves, the nut may be one of a ball screw nut that is screwed to the screw groove of the screw shaft via balls and a spline nut that is splined to the spline grooves of the screw shaft via balls, and the outer diameter of the nut and the inner diameter of the nut holding portion may gradually decrease in such a manner that if a force that overcomes the biasing force is applied to the nut when the stopper hits the housing, the friction force between the outer peripheral face of the nut and the inner peripheral face of the nut holding portion decreases to allow relative movement between the nut and the nut holding portion.

The ball screw unit may include a spline element, and may be used in, for example, the following manner. The ball screw nut rotates and the screw shaft moves linearly due to the rotation of the ball screw nut, and the linear motion of the screw shaft is guided by the spline nut.

A ball screw protection unit is formed of a nut taper face that is formed in the outer peripheral face of one of the spline nut and the ball screw nut, a holding portion taper face that is formed in the nut holding portion so as to conform to the nut taper face, and the nut biasing member. The ball screw protection unit is obtained by changing the shapes of an existing nut (ball screw nut or spline nut) and an existing nut holding portion. In both the case where the structure of the ball screw nut is changed and the case where the structure of the spline nut is changed, the nut taper face is formed in the outer peripheral face of the nut, and the holding portion taper face is formed in the nut holding portion so as to conform to the nut taper face. The nut holding portion is obtained by gradually decreasing the inner diameter of an existing member (housing or hollow shaft) in a predetermined direction. Alternatively, the nut holding portion is obtained by fixing a member having a gradually decreased inner diameter to the inner peripheral face of an existing member (housing or hollow shaft). The nut and the nut holding portion are fitted to each other with a friction force and an elastic force by using the nut biasing member that biases the nut in such a direction that a friction force between the nut taper face and the holding portion taper face increases (in the direction in which the outer diameter of the nut and the inner diameter of the nut holding portion decrease). Therefore, when the ball screw unit is used in a normal condition, the nut and the nut holding portion move together with respect to the screw shaft, and the ball screw unit according to the aspect of the invention operates in the same manner as an existing ball screw unit. The nut and the nut holding portion are arranged coaxially. The outer diameter of the nut and the inner diameter of the nut holding portion gradually decrease in the same direction. The direction in which the outer diameter of the nut and the inner diameter of the nut holding portion gradually decrease is determined based on the direction of a force that is applied when the stopper hits a predetermined portion. The stopper is provided in such a manner that the force that is generated when the stopper hits the predetermined portion is applied in the direction (in such a direction that a friction force between the taper faces decreases) opposite to the direction in which the outer diameter of the nut and the inner diameter of the nut holding portion decrease (the direction same as the direction in which the biasing member biases the nut). Thus, when the stopper hits the predetermined portion, the force applied between the nut and the nut holding portion decreases. When the force that is applied to the nut when the stopper hits the predetermined portion overcomes the biasing force of the nut biasing member, the nut and the nut holding portion are allowed to move relative to each other. Thus, a force applied between the screw shaft and the nut decreases.

In the ball screw unit according to the aspect of the invention described above, one of the ball screw and the ball screw nut is used as a ball screw rotation member, and the other of the ball screw and the ball screw nut is used as a ball screw linear-motion member. The ball screw rotation member is connected to a rotor of a motor. Such a ball screw unit may be used as an actuator. In this case, the ball screw nut is rotated by the motor and the screw shaft is moved linearly, or the screw shaft is rotated by the motor and the ball screw nut is moved linearly. Alternatively, such a ball screw unit may be used as a shock absorber. In this case, the screw shaft is moved linearly by an external force, the ball screw nut is rotated, and an electromagnetic force generated by the motor is used as a damping force, or the ball screw nut is moved linearly by an external force, the screw shaft is rotated, and an electromagnetic force generated by the motor is used as a damping force.

In either case, the screw shaft reciprocates linearly. Usually, a stopper is provided to prevent the screw shaft from moving by an amount that exceeds a predetermined amount in a predetermined direction in the axial direction (predetermined direction is referred to as "forward direction" in this specification. The term "forward direction" signifies the direction in which the screw shaft moves to cause the stopper to hit a predetermined portion. The "forward direction" may be any direction, for example, upward direction, downward direction, forward direction, rearward direction, rightward direction or the leftward direction). The stopper may directly hit the nut. Alternatively, the stopper may hit a portion to which the but is fixed to apply a predetermined amount of force to the nut. The stopper may be, for example, a flange portion formed on the ball screw linear-motion member, which contacts the housing when the ball screw linear-motion member moves by a predetermined amount. Alternatively, the stopper may be formed on a member that linearly moves along with the ball screw linear-motion member, or may be provided on a member that does not move linearly (housing or hollow shaft).

Because the movement limit position of the ball screw linear-motion member is defined by the stopper, the ball screw linear-motion member is forcibly stopped when the ball screw linear-motion member reaches the movement limit position. If the ball screw linear-motion member is moving at a high speed, a rotational inertia force of the ball screw rotation member is large when the ball screw linear-motion member is suddenly stopped. Therefore, an indentation may be formed in a ball screw path portion. Usually, the ball screw rotation member and the rotor of the motor are rigidly connected to each other. Accordingly, when the movement of the ball screw linear-motion member is forcibly stopped, an inertia force of the rotor of the motor is applied to the ball screw rotation member. Therefore, there is a high possibility that an indentation occurs.

In contrast, with the ball screw unit according to the embodiment of the invention, if the ball screw rotation member is suddenly stopped while rotating together with the rotor of the motor, the nut is allowed to move with respect to the nut holding portion. Therefore, rotational inertia forces of the ball screw rotation member and the rotor of the motor are not applied to the ball screw linear-motion member. As a result, it is possible to prevent application of a large force, which may cause an indentation, to the ball screw path portion. Accordingly, the ball screw rotation member and the rotor of the motor may be rigidly connected to each other as in an existing ball screw unit.

In the ball screw unit according to the aspect of the invention described above, the nut may be the spline nut, the nut holding portion may be a part of the housing, and may be formed so as to define an opening which is formed at an end of the housing, the outer diameter of the nut and the inner diameter of the nut holding portion may gradually decrease toward the opening of the housing, the nut biasing member may bias the spline nut toward the opening of the housing, and the stopper may hit an end face of the spline nut, the end face being close to the opening of the housing, immediately before hitting the housing. This structure is especially effective when the ball screw nut serves as the ball screw rotation member that is connected to the motor in such a manner that the ball screw nut is allowed to rotate but is not allowed to move linearly, and the screw shaft serves as the ball screw linear-motion member.

The ball screw unit according to the aspect of the invention described above may further include a cylindrical body that is arranged coaxially with the screw shaft, that is fitted in the housing in such a manner that the cylindrical body is allowed to move linearly, and that is adjacent to the nut via the biasing member. The nut may be the ball screw nut and move linearly, the nut holding portion may be a cylindrical nut case that is fitted onto the nut and that is fixed to the cylindrical body, the outer diameter of the nut and the inner diameter of the nut holding portion may gradually decrease in the direction in which the nut moves forward, and the nut biasing member may bias the nut in the direction in which the nut moves forward. This structure is especially effective when the screw shaft serves as the ball screw rotation member that is connected to the motor in such a manner that the screw shaft is allowed to rotate but is not allowed to move linearly, the ball screw nut serves as a ball screw linear-motion member, and a linear motion-side member, for example, the cylindrical body, is fixed to the ball screw nut. In addition, this structure may be employed in a ball screw that does not include a spline element.

The spline may be ball spline or engagement-type spline, for example, involute spline.

The biasing member may be, for example, a disc spring. However, the biasing member is not limited to a disc spring. Various types of springs may be used as the biasing member.

With the ball screw unit according to the aspect of the invention described above, when the stopper hits the housing, the nut is allowed to move with respect to the nut holding body due to an impact load, and formation of an indentation in the ball screw path portion is prevented. Therefore, an impact load that is applied to the ball screw linear-motion member is reduced, whereby formation of an indentation in the ball screw path portion is prevented. Thus, it is possible to solve the problem that an inertia moment increases when a larger-sized ball screw unit is employed to ensure sufficient strength of the ball screw. As a result, it is possible to produce a more compact and lighter ball screw unit.

BRIEF DESCRIPTION OF THE DRAWINGS

The foregoing and further features and advantages of the invention will become apparent from the following description of example embodiments with reference to the accompanying drawings, wherein the same or corresponding portions will be denoted by the same reference numerals and wherein.

DETAILED DESCRIPTION OF EXAMPLE EMBODIMENTS

Figure 1:
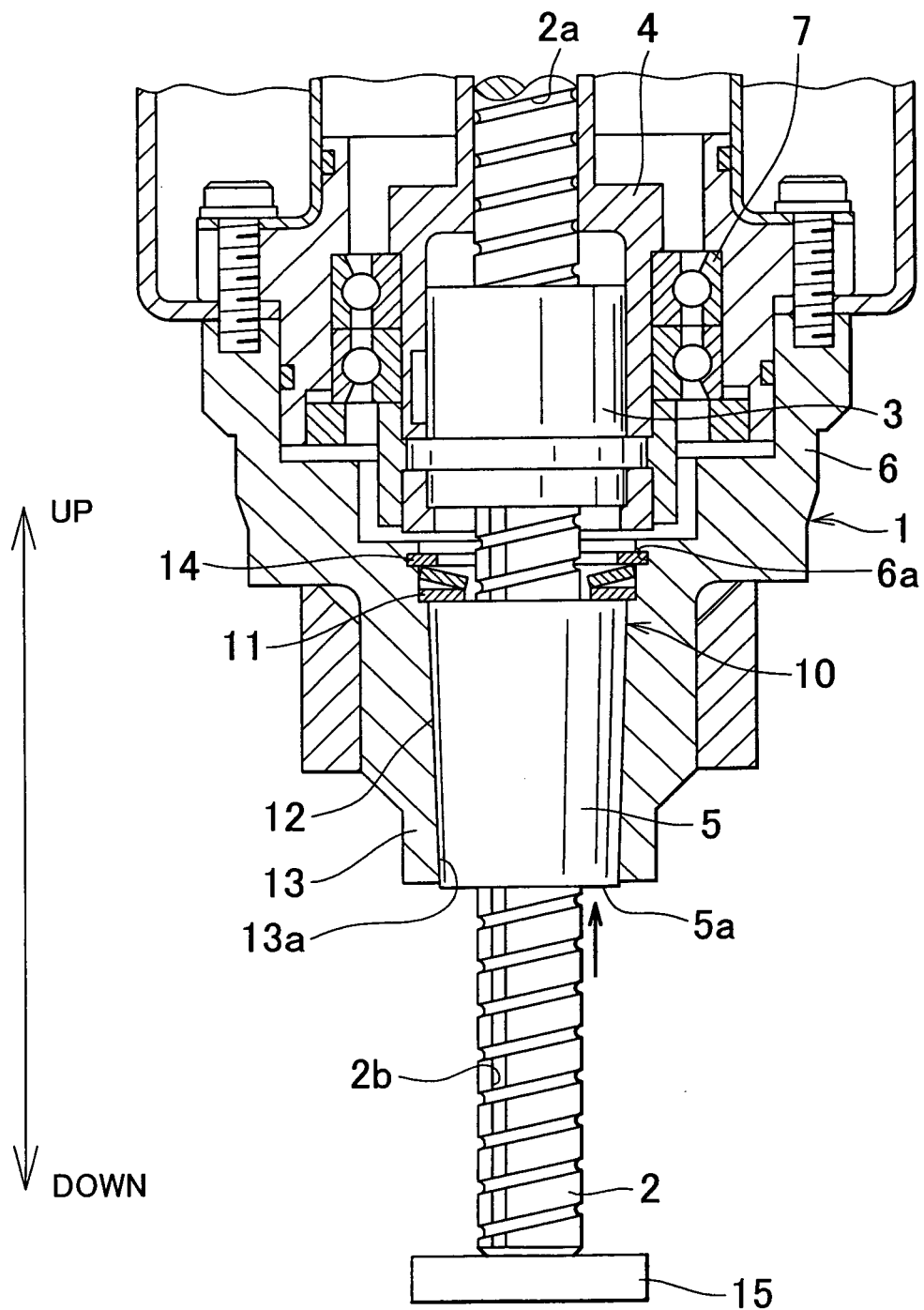
FIG. 1 is a cross-sectional view showing a ball screw unit according to a first embodiment of the invention.

Hereafter, example embodiments of the invention will be described with reference to the accompanying drawings. The "up-and-down direction", the "upward direction", and the "downward direction" in the description below are directions indicated by arrows in the drawings. The "forward direction" in the description below corresponds to the "upward direction". Note that, these expressions concerning the directions are employed just for ease of explanation, and the orientation of a ball screw unit according to each embodiment of the invention when it is actually used is not particularly limited.

FIG. 1 shows a ball screw unit according to a first embodiment of the invention.

A ball screw unit 1 includes: a steel screw shaft 2 that extends in the up-and-down direction and that has a screw groove 2a and spline grooves 2b which extend in the up-and-down direction; a ball screw nut 3 that is screwed to the screw groove 2a of the screw shaft 2 via balls; a hollow shaft 4 that is fixed to the ball screw nut 3 and that extends in the upward direction; a ball spline nut 5 that is splined to the spline grooves 2b of the screw shaft 2 via balls and that guides linear motion of the screw shaft 2 in the up-and-down direction (axial direction of the screw shaft 2); a cylindrical housing 6 that rotatably holds the hollow shaft 4 via a bearing 7 and that holds the ball spline nut 5; and a ball screw protection unit 10 that protects a ball screw.

The screw shaft 2 and the hollow shaft 4 are coaxially arranged. A rotor (not shown) of a motor is fixed to an upper portion of the hollow shaft 4 of the ball screw unit 1, and the hollow shaft 4 and the ball screw nut 3 are rotated to produce linear motion of the screw shaft 2. The ball screw unit 1 is used in this manner.

In an existing ball screw unit, the spline nut 5 is not allowed to rotate with respect to the housing 6 and is not allowed to move with respect to the housing 6 in the axial direction. In contrast, in the ball screw unit 1 according to the first embodiment of the invention, the spline nut 5 is held by the housing 6 with an elastic force and a friction force. Therefore, when supplied with a force that acts in the direction opposite to the direction of the elastic force and the friction force, the spline nut 5 is allowed to rotate with respect to the housing 6 and to move with respect to the housing 6 in the direction opposite to the direction of the elastic force and the friction force.

A nut body holding portion 13 that holds the spline nut 5 is formed so as to define an opening of the housing 6, which is formed at a lower end portion of the housing 6. An inner peripheral face 13a of the nut body holding portion 13 is a taper face (holding portion taper face) that is formed in such a manner that the inner diameter of the nut body holding portion 13 decreases toward the opening (toward a lower end thereof). A nut body taper face 12 that conforms to the holding portion taper face 13a is formed in an outer peripheral face of the spline nut 5 which is held by the nut body holding portion 13.

The ball screw protection unit 10 includes the nut body taper face 12 that is formed in the outer peripheral face of the spline nut (nut body) 5, the holding portion taper face 13a that is formed in the nut body holding portion 13, and a disc spring 11 that is arranged at an upper end of the spline nut 5 and that serves as a nut body biasing member which biases the spline nut 5 in such a direction that a friction force between the nut body taper face 12 and the holding portion taper face 13a increases (in the downward direction).

The taper faces 12 and 13a are placed in close contact with each other under a biasing force of the disc spring 11, which acts in the downward direction. Therefore, if an upward force that is large enough to overcome the biasing force of the disc spring 11 is applied to the spline nut 5, the spline nut 5 is allowed to move with respect to the housing 6 in the upward direction and is allowed to rotate with respect to the housing 6.

The disc spring 11 is provided between a retaining ring 14 that is fitted in an annular groove 6a formed in an inner peripheral face of the housing 6 and a top face of the spline nut 5. The disc spring 11 biases the spline nut 5 in the downward direction so that the spline nut 5 approaches the opening.

A stopper 15 is arranged so as to hit an opening-side end face 5a of the spline nut 5, as indicated by an arrow, when the screw shaft 2 attempts to move forward excessively.

The ball screw unit 1 is suitable for, for example, an electromagnetic suspension for a vehicle. The electromagnetic suspension is a shock absorber that converts axial motion transmitted from a tire into rotational motion with the use of a ball screw mechanism, introduces this rotational motion into a motor, and uses an electromagnetic force generated by the motor as a damping force. When overstroke of the suspension occurs, for example, because a vehicle runs on to a bump, the screw shaft 2 moves in the upward direction (forward direction) at a high speed and a bump stopper that is provided at a linear motion portion hits, for example, a motor flange. In this case, the motor, which has been rotating at a high speed, suddenly stops and an excessive axial force may be applied to the path portions 2a and 2b (screw groove 2a and spline grooves 2b) of the ball screw formed of the screw shaft 2, the ball screw nut 3 and the spline nut 5 due to an inertia torque of the motor. How to protect the ball screw mechanism in this case is an issue to be resolved.

In the ball screw unit 1 according to the first embodiment of the invention, when forward motion of the screw shaft 2 is stopped by the stopper 15, a large rotational inertia force is applied to the ball screw nut 3, and the screw shaft 2 receives a rotational force from the ball screw nut 3. If the spline nut 5 is not allowed to rotate with respect to the screw shaft 2, an indentation may be formed in a ball screw path because the spline nut 5 receives the large rotational force. However, because the taper face 12 of the spline nut 5 is just in close contact with the taper face 13a of the housing 6, the spline nut 5 is allowed to move in the upward direction and is allowed to rotate with respect to the housing 6. Thus, the spline nut 5 no longer restricts the motion of the screw shaft 2. As a result, it is possible to prevent application of a large force, which may cause an indentation, to the path portion of the ball screw.

The ball screw unit 1 may be used as an electric actuator. In this case, a rotational drive force from the motor is converted into a thrust force, which acts in the axial direction of the screw shaft 2, via the ball screw nut 3, an axial reaction force against the thrust force is received by the bearing 7 to produce linear motion of the screw shaft 2, an axial load that is applied to the screw shaft 2 is borne by the ball screw nut 3, and a torque is received by the ball spline nut 5.

Figure 2:
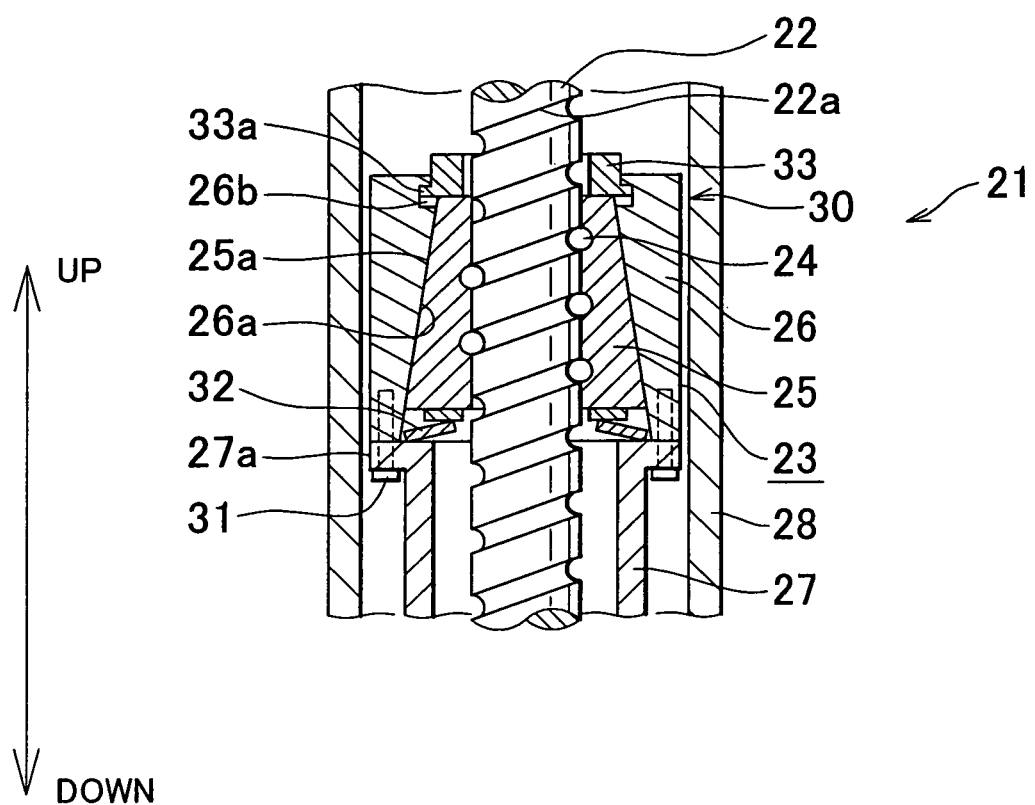
FIG. 2 is an enlarged cross-sectional view showing a main portion of a ball screw unit according to a second embodiment of the invention.

FIG. 2 shows a ball screw unit according to a second embodiment of the invention. A ball screw unit 21 includes a screw shaft 22 that has a screw groove 22a and that extends in the up-and-down direction, a ball screw nut 23 that is formed of a nut body 25 which is screwed to the screw groove 22a of the screw shaft 22 via balls 24 and a cylindrical nut case 26 that serves as a nut body holding portion which is fitted onto the nut body 25, a cylindrical body 27 that is arranged coaxially with the screw shaft 22, that is fitted in a housing 28 in such a manner that the cylindrical body 27 is allowed to move linearly, and that is fixed to the nut case 26, and a ball screw protection unit 30 that protects a ball screw.

The ball screw unit 21 is used in, for example, an electromagnetic shock absorber. In this case, a motor (not shown) is connected to the screw shaft 22. With this structure, the ball shaft 22 serves as a ball screw rotation member that is allowed to rotate but is not allowed to move linearly, the ball screw nut 23 serves as a ball screw linear-motion member that is not allowed to rotate but is allowed to move linearly, and the cylindrical body 27 serves as a linear motion-side member that receives a force from the ground. When rotation of the cylindrical body 27 is prevented, the ball screw nut 23 is prevented from rotating along with the screw shaft 22.

In an existing ball screw unit, the ball screw nut 23 is directly fixed to the cylindrical body 27 (so that the ball screw nut 23 always moves together with the cylindrical body 27). However, in the ball screw unit 21 according to the second embodiment of the invention, the nut case 26, which is a member separate from the nut body 25 that is screwed to the screw groove 22a via the ball 24, is arranged between the nut body 25 and the cylindrical body 27. The nut body 25 is allowed to move (move linearly and rotate) with respect to the nut case 26 and the cylindrical body 27 that is fixed to the nut case 26 when required.

An outer peripheral face of the nut body 25 is a taper face 25a. A taper face 26a that conforms to the taper face 25a is formed in an inner peripheral face of the nut case 26.

A flange portion 27a is formed at an upper end of the cylindrical body 27. A bottom face of the nut case 26 is held by a top face of the flange portion 27a of the cylindrical body 27, and the nut case 26 is fixed to the flange portion 27a with screws 31. The nut case 26 always moves together with the cylindrical body 27 because the nut case 26 is fixed to the flange portion 27a of the cylindrical body 27 with the screws 31.

A bottom face of the nut body 25 is held by a top face of the flange portion 27a at a portion near the inner periphery, via a disc spring 32 that biases the nut body 25 in the upward direction.

The ball screw protection unit 30 includes the nut body taper face 25a that is formed in the outer peripheral face of the nut body 25 of the ball screw nut 23, the holding portion taper face 26a that is formed in the nut body holding portion (nut case) 26, and the disc spring 32 that serves as a nut body biasing member which biases the nut body 25 in the upward direction.

An annular groove 26b is formed in an upper end portion of the nut case 26, and a flange portion 33a of an annular stopper 33 is fitted in the annular groove 26b. When the annular stopper 33 is fitted in the annular groove 26b, a top face of the annular stopper 33 is above a top face of the nut case 26. The axial length of the flange portion 33a is smaller than the axial length of the annular groove 26b. The stopper 33 is allowed to move in the up-and-down direction within a range defined by the axial length of the annular groove 26b. A top face of the nut body 25 contacts a bottom face of the stopper 33, and an upward movement of the stopper 33 is prevented by the annular groove 26b, whereby an upward biasing force of the disc spring 32 is received by the stopper 33.

The taper face 25a of the nut body 25 and the taper face 26a of the nut case 26 are taper faces that are formed in such a manner that the outer diameter of the nut body 25 and the inner diameter of the nut case 26 decrease toward the upper ends thereof. When an upward biasing force of the disc spring 32 is applied, the taper faces 25a and 26a receive a force that is applied in such a direction that a friction force between the taper faces 25a and 26a increases. Thus, relative rotation between the nut body 25 and the nut case 26 is prevented.

The stopper 33 hits, for example, a bearing support portion of the housing 28 when the cylindrical body 27 moves in the upward direction, thereby defining the maximum travel amount of the cylindrical body 27.

In the structure described above, a combination of the nut body 25 and the nut case 26 (ball screw nut 23) corresponds to an existing ball screw nut, until the cylindrical body 27 reaches the uppermost travel position and the stopper 33 hits, for example, the bearing support portion of the housing 28. When the cylindrical body 27 moves in the upward direction, the nut body 25 receives an upward force via the disc spring 32 and moves in the upward direction together with the cylindrical body 27. When the cylindrical body 27 moves in the downward direction, the nut body 25 receives a downward force from the nut case 26 that is fixed to the cylindrical body 27, and moves in the downward direction together with the cylindrical body 27.

In the existing ball screw nut, when the cylindrical body 27 moves in the upward direction at a high speed due to an external force and the stopper 33 hits the housing 28, a large inertia torque may be applied between the screw shaft 22 that attempts to continuously rotate and the ball screw nut 23 which no longer moves linearly, and a high load may be applied to the ball screw.

In contrast, in the ball screw unit 21 according to the second embodiment of the invention, when the stopper 33, which defines the maximal travel amount of the cylindrical body 27, hits a predetermined portion of the housing 28, a force which acts in the direction opposite to the direction of the biasing force of the disc spring 32 (downward direction) is applied to the nut body 25. This force acts in such a direction that the taper face 25a of the nut body 25 and the taper face 26a of the nut case 26 move away from each other, that is, in such a direction that a friction force between the taper face 25a and the taper face 26a is reduced. Thus, the nut body 25 and the nut case 26 are allowed to rotate relative to each other. Therefore, even if the screw shaft 22, which has been rotating at a high speed, suddenly stops because the stopper 33 hits the predetermined portion of the housing 28, a large force is not applied between the nut body 25, which has been allowed to rotate (or to which a smaller rotational friction force is applied), and the screw shaft 22. As a result, it is possible to prevent formation of an indentation in the ball screw path.

A biasing member that biases the nut body 25 in the upward direction may be a spring other than the disc spring 32 or an elastic body, for example, a rubber body. Various types of members may be used as the stopper 33 as long as the member is able to move the nut body 25 in the downward direction when the stopper 33 hits a predetermined portion. The housing 28 may be provided with the stopper 33 (for example, at a position near a bearing support portion).

What is claimed is:

1. A ball screw unit, comprising:
   a screw shaft including a groove;
   a nut that is fitted to the groove of the screw shaft via balls and that has an outer diameter which gradually decreases in a predetermined direction;
   a nut holding portion that disposed on an outer peripheral face of the nut, that holds the nut, and that has an inner diameter which gradually decreases in the predetermined direction in accordance with a gradual decrease in the outer diameter of the nut; and
   a nut biasing member that biases the nut in the predetermined direction in which the outer diameter of the nut and the inner diameter of the nut holding portion gradually decrease, wherein the outer diameter of the nut and the inner diameter of the nut holding portion gradually decrease in such a manner that when a force that proceeds in a direction opposite to a direction of the biasing force of the nut biasing member and that overcomes the biasing force is applied to the nut, a friction force between the outer peripheral face of the nut and an inner peripheral face of the nut holding portion decreases to allow relative movement between the nut and the nut holding portion, wherein the nut biasing member is disposed on an end of the nut, the end of the nut having an outer diameter greater than an outer diameter of an other end of the nut, and wherein the nut and nut holding portion are configured such that, when the nut reaches a movement limit position of the nut in the direction of the biasing force, the nut holding portion continues moving in the direction of the biasing force.

2. A ball screw unit, comprising:

a screw shaft including a groove;

a nut that is fitted to the groove of the screw shaft via balls and that has an outer diameter which gradually decreases in a predetermined direction;

a nut holding portion that is provided on an outer peripheral face of the nut, that holds the nut, and that has an inner diameter which gradually decreases in the predetermined direction in accordance with a gradual decrease in the outer diameter of the nut;

a nut biasing member that biases the nut in the predetermined direction in which the outer diameter of the nut and the inner diameter of the nut holding portion gradually decrease;

a housing that holds the screw shaft;

a stopper that defines a movement limit position of the nut, which is a member that moves linearly, in a direction in which the nut moves forward, by hitting a predetermined portion of the housing; and a cylindrical body that is arranged coaxially with the screw shaft, that is fitted in the housing in such a manner that the cylindrical body is allowed to move linearly, and that is adjacent to the nut via the biasing member, wherein the outer diameter of the nut and the inner diameter of the nut holding portion gradually decrease in such a manner that when a force that proceeds in a direction opposite to a direction of the biasing force of the nut biasing member and that overcomes the biasing force is applied to the nut, a friction force between the outer peripheral face of the nut and an inner peripheral face of the nut holding portion decreases to allow relative movement between the nut and the nut holding portion, wherein the nut is a ball screw nut, wherein the nut holding portion is a cylindrical nut case that is fitted onto the nut and that is fixed to the cylindrical body, wherein the outer diameter of the nut and the inner diameter of the nut holding portion gradually decrease in the direction in which the nut moves forward, and wherein the nut biasing member biases the nut in the direction in which the nut moves forward.

3. The ball screw unit according to claim 2, wherein the direction in which the nut moves forward is a direction in which the nut moves away from the cylindrical body.

4. The ball screw unit according to claim 3, wherein:

an annular groove is formed in an end portion of the nut case, the end portion being distant from the cylindrical body;

the stopper is an annular member that has a flange portion, and a portion of the stopper protrudes from the nut case in an axial direction when the flange portion is fitted in the annular groove of the nut case; and an axial length of the flange portion is less than an axial length of the annular groove; and the nut contacts the stopper.

5. The ball screw unit according to claim 4, wherein the nut biasing member is arranged between the cylindrical body and the nut.

6. The ball screw unit according to claim 1, wherein the nut biasing member is disposed on a side of the nut having an outer diameter greater than an outer diameter of the remainder of the nut.

7. The ball screw unit according to claim 1, further comprising a cylindrical body that is arranged coaxially with the screw shaft and attached to the nut holding portion in such a manner that the cylindrical body is allowed to move linearly, and wherein the nut biasing member is disposed between the cylindrical body and the nut.

8. The ball screw unit according to claim 1, further comprising:

a housing that holds the screw shaft; and a cylindrical body that is arranged coaxially with the screw shaft, that is fitted in the housing in such a manner that the cylindrical body is allowed to move linearly, and that is adjacent to the nut via the biasing member.

9. The ball screw unit according to claim 1, wherein the nut biasing member biases the nut in the direction in which the nut moves forward.

10. The ball screw unit according to claim 1, wherein the nut biasing member is disposed on a distal end face of the nut.

* * * * *